Patented Sept. 4, 1928.

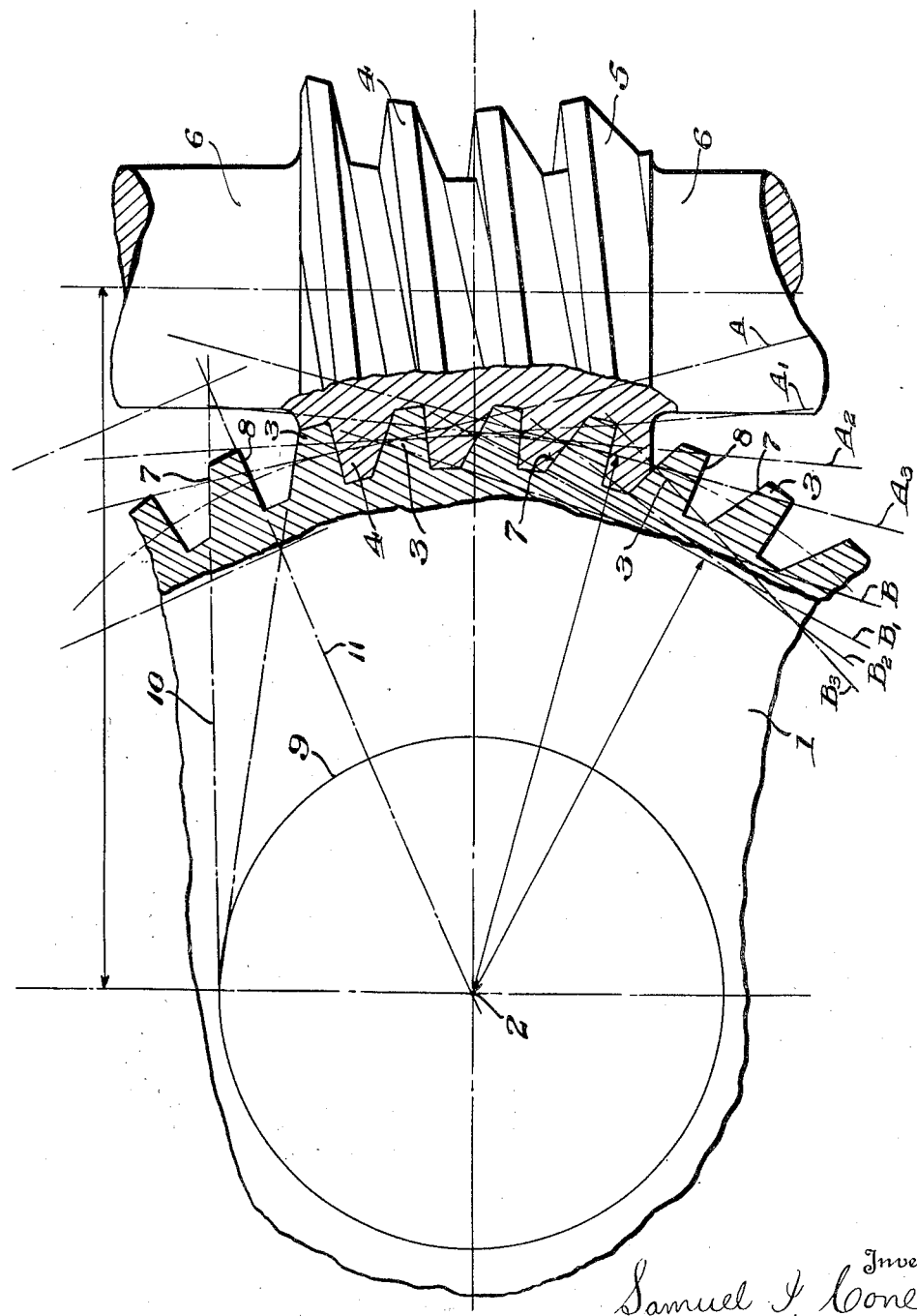

1,683,163

UNITED STATES PATENT OFFICE.

SAMUEL I. CONE, OF PORTSMOUTH, VIRGINIA, ASSIGNOR TO CONE GEARING CORPORATION, OF NORFOLK, VIRGINIA, A CORPORATION OF VIRGINIA.

PRECISION WORM GEARING.

Application filed June 27, 1925. Serial No. 40,114.

This invention relates to an improvement in precision worm gearing.

The object of my invention is to form the members of a system of worm gearing with surfaces which may be easily generated so that both the worm and worm gear will be generated to a high degree of precision. The flanks of the worm wheel teeth may have a twisted or warped surface correctly generated and disposed at an acute angle to each other, or they may be straight sided spur gear, or skew teeth.

Another object of the present invention is to form a system of worm gearing in which the pressure angle between the worm and worm wheel is different on opposite sides of the teeth. This enables the pressure angle of that side of the tooth, which carries the greatest load and which forms the principal driving side, to be increased thereby increasing the length of the effective turning lever in order to give a greater turning moment, thus increasing the efficiency of the gears. In other words, this results in increasing the power component applied to work and reducing the thrust component tending to force the gears apart, the latter always being a dead loss.

Another object of my invention consists in providing teeth on worm wheels adapted to intermesh with corresponding threads of Hindley or hourglass worms, the slope being greater on one side of the tooth or thread than on the other; the purpose of which being to provide a combination in which increased loading in one direction will be met by reduced angular engagement of the mating surfaces. This permits of greater power being transmitted when turning in one direction than in the opposite direction. The intermeshing threads and teeth on the worm and worm wheel are so formed that when taken at the midplanes the lines forming continuations of the adjacent straight sides would pass on opposite sides of the center axis of the wheel and one of these lines would be at a greater distance from the axis than the other, or one of the said lines would pass through the axis of the worm wheel and the other to the side of said axis.

This system of gearing is particularly adapted to the transmission of power where more power is required to be transmitted in one direction of rotation than is required to be transmitted in the other direction. With this form of gearing the desired result may be obtained without varying the power delivered to the shaft of the worm.

The accompanying drawing shows a side elevation partly in section and partly in diagram of the formation of my precision worm gearing.

The numeral 1 indicates a gear wheel mounted to rotate on its center axis 2 and having circumferential teeth 3 at its outer edge for intermeshing with a thread 4 formed on the worm 5. This worm 5 is formed as an integral part of its shaft 6 and the thread 4 may be generated from a blank formed on this shaft. The side surface 7 of each tooth 3 and the corresponding side surface of the thread 4 are generated at an acute angle to the opposite side surface 8 of each tooth, and the surface 7 is given a greater slope than the surface 8.

As shown in the drawing, lines forming a continuation of the surfaces 7 are all tangent to the circle 9. Lines forming continuations of the surface 8 all pass either through the axis 2 or on the opposite side of the axis 2, from the respective lines extending from the surfaces 7. In other words, the line 10 forming a continuation of the side 7 is tangent to the circle 9 whereas the line 11 forming a continuation of the side surface 8 either passes directly through the axis 2 or on the opposite side of the axis from the line 10. This permits of these side surfaces being generated of different slopes relative to each other so that the pressure angle of the principal driving side of each tooth may be increased to enable the teeth to transmit a greater load or to provide increased strength and driving power for the teeth when the wheel is rotating in one direction than when rotating in the opposite direction.

As shown in the drawing, the worm 5 is of the Hindley screw-type so that its thread is intermeshed with the teeth of the worm wheel throughout its entire length. The inner and outer surfaces of the teeth 3, on the gear wheel, are properly generated and grooved out to receive the worm and so that this worm and its thread 4 will fit closely into the gear and intermesh with its thread so as to form a driving connection between this worm and gear throughout the length of contact. The cross sectional shape of the side surface of the thread 4 is similar to the shape of the teeth 3 on the gear wheel 1, so that these parts will properly intermesh.

The lines $A$, $A^1$, $A^2$, and $A^3$, are all tangent to the pitch circle or at right angles to the sides 8 and represent the lines of pressure when the sides 8 of the teeth are under pressure.

The lines $B$, $B^1$, $B^2$, and $B^3$, intersect the pitch circle and are the lines of pressure when the sides 7 of the teeth are under pressure. Thus it will be seen by varying the slope of the sides of the teeth, greater or less power may be transmitted in either direction of rotation as may be desired.

I claim:

1. A gear wheel for precision worm gearing whereof the teeth are formed with flanks disposed at an acute angle with relation to each other and have relatively unequal slopes to provide for small pressure angle and whereby, when operating with a complemental worm at least four of said teeth will have simultaneous effective sliding contact with relation to the worm.

2. A system of precision gearing comprising, in combination, a worm wheel having teeth generated with flanks at a relative acute angle and lying in planes passing at unequal distances from the center axis of the wheel, and a worm generated to intermesh therewith, whereby at least four of said teeth will have simultaneous effective sliding contact.

In testimony whereof I affix my signature.

SAMUEL I. CONE.